Nov. 7, 1944.    O. B. ACKERLY, JR    2,362,231
FILTER
Filed July 27, 1942    2 Sheets-Sheet 1
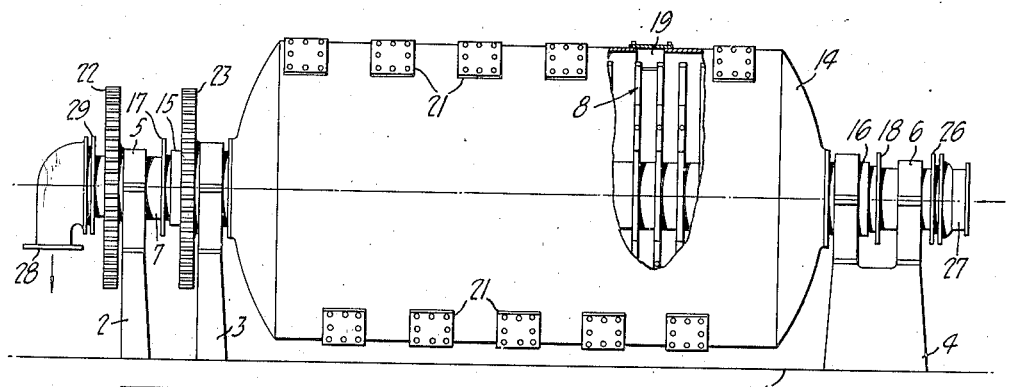
FIG_1_
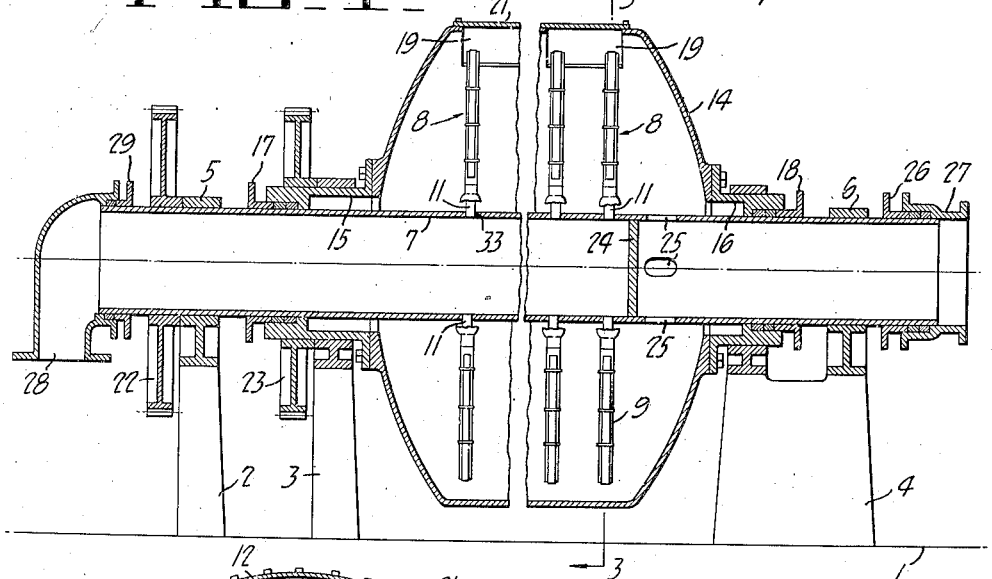
FIG_2_
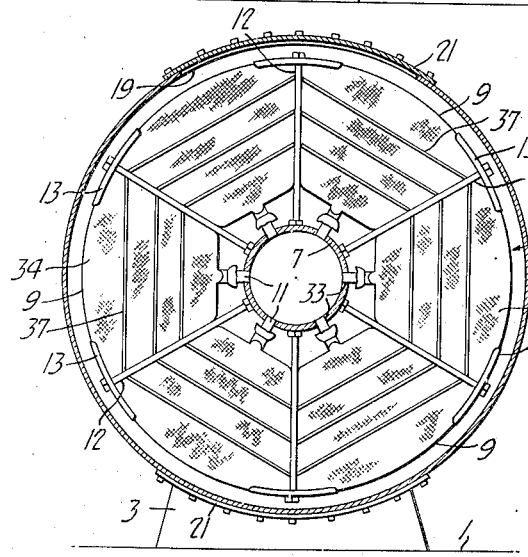
FIG_3_
INVENTOR.
Orville B. Ackerly Jr.
BY
ATTORNEY.

Nov. 7, 1944.   O. B. ACKERLY, JR   2,362,231
FILTER
Filed July 27, 1942   2 Sheets-Sheet 2
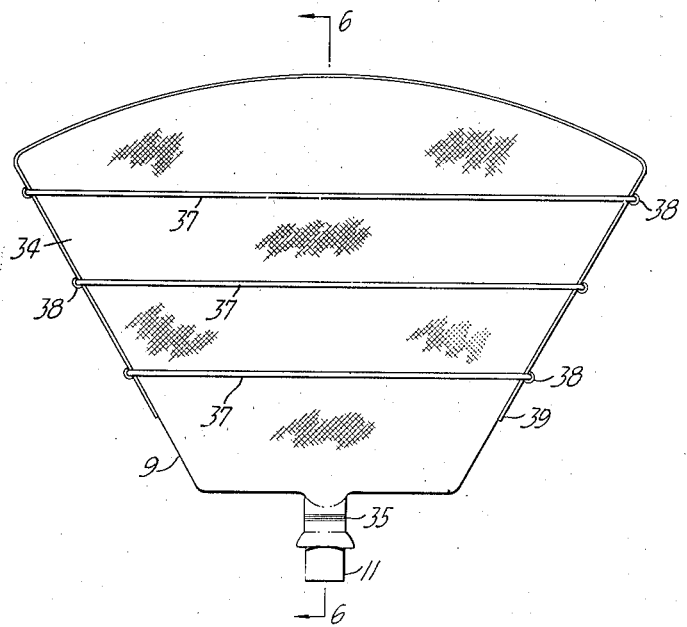
FIG_4_
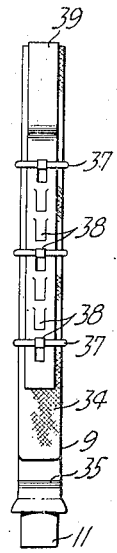
FIG_5_
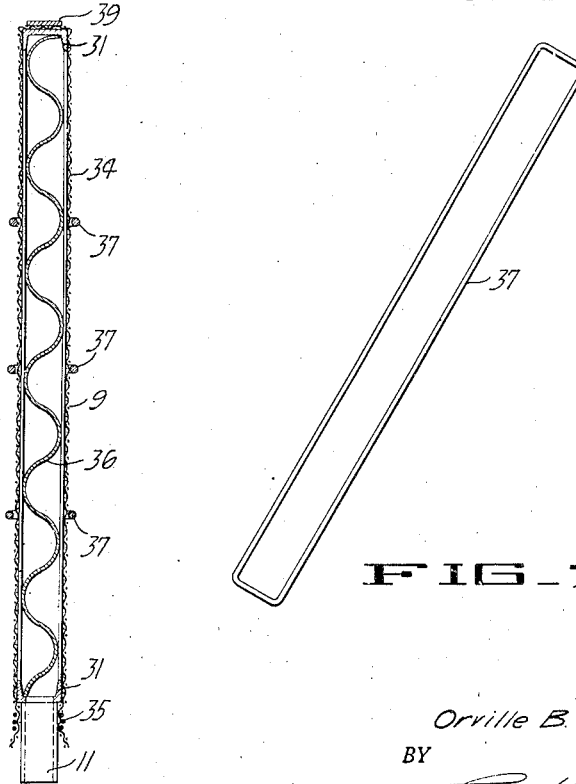
FIG_6_
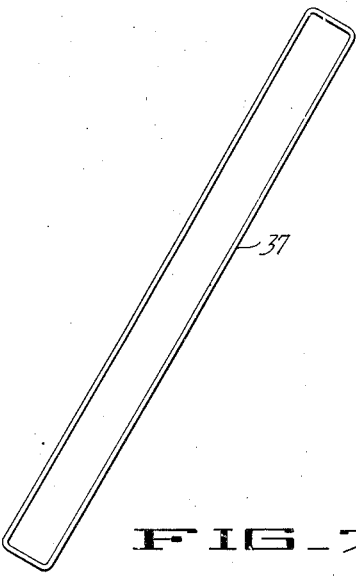
FIG_7_
INVENTOR.
Orville B. Ackerly Jr.
BY
ATTORNEY Patented Nov. 7, 1944

2,362,231

UNITED STATES PATENT OFFICE 2,362,231

FILTER

Orville B. Ackerly, Jr., Piedmont, Calif., assignor to Oliver United Filters Incorporated, Oakland, Calif., a corporation of Nevada Application July 27, 1942, Serial No. 452,386

7 Claims. (Cl. 210—200)

This invention relates in general to rotary filters, and more particularly to rotary pressure filters.

One of the problems encountered in operating pressure filters is to maintain the material being filtered in a homogeneous or uniform condition so that a homogeneous or uniform cake can be deposited on the filter element. One of the expedients which has been resorted to in dealing with this problem is to rotate the filter elements, and while this has been beneficial in maintaining the material to be filtered in a more uniform condition, it has not been entirely satisfactory. Another expedient resorted to has been to provide the filter casing with an agitator in the form of a scroll, which may also be used for conveying the discharged solids from the filter casing. While this also serves to keep the pulp or slurry in a state of agitation, it entails a more expensive construction, for a trough must be formed in the casing to receive the scroll, and due to the resulting form, the casing must be of far more rugged construction than is required when a true cylindrical casing is used.

Another difficulty encountered in the operation of pressure filters is that the filter cakes formed on adjacent sides of adjacent filter elements twin or bridge unless the filter elements are excessively spaced from each other. Twinning of the cakes is objectionable for the reason that when this occurs, the reduced pressure between the adjacent sides of adjacent filter elements causes them to deflect toward each other, and frequently this twinning and bending of the filter elements causes the filter elements to break, making it necessary to shut down the filter and make major repairs. Excessive spacing of the filter elements is objectionable because it cuts down the capacity of the filter.

One of the objects of this invention is the provision of a cylindrical rotary pressure filter in which agitation of the pulp or slurry is effected by independently but simultaneously rotating the filter casing as well as the filter leaves.

Another object of this invention is the provision of a sectionalized disc filter in which the disc sectors are provided with loops for preventing the filter medium from bulging outwardly upon the application of a blow back or reverse differential pressure.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 1 is a side elevation of a rotary disc pressure filter embodying the objects of my invention.

Figure 2 is a vertical mid-section of the filter shown in Figure 1.

Figure 3 is a vertical section taken on the line 3—3 of Figure 2.

Figure 4 is an enlarged side elevation of one of the filter sectors shown in the disc illustrated in Figure 3.

Figure 5 is an end elevation of the filter sector shown in Figure 4.

Figure 6 is an enlarged vertical section taken on the line 6—6 of Figure 4.

Figure 7 is a plan view of one of the wire loops shown in Figures 4, 5, and 6, for retaining the filter medium on the filter sectors.

As shown in these various figures, the objects of my invention are embodied in a rotary pressure filter comprising a base 1 on which are mounted pedestals 2, 3, and 4. Journaled in bearings 5 and 6 carried by the pedestals 2 and 4 is a rotatable hollow shaft 7. Mounted in spaced relation along the hollow shaft 7 are a plurality of complete filter discs 8, each formed by a plurality of disc sectors 9 communicating with the hollow shaft 7 by nipples 11, and secured thereto in the usual fashion by radial rods 12 and clamps 13.

Enclosing the filter discs 8 is a cylindrical filter casing 14 journaled on the shaft 7 by means of trunnions 15 and 16. Associated with the trunnions 15 and 16 are stuffing boxes 17 and 18. Formed in the surface of the casing 14 are a plurality of openings 19 through which access to the filter discs may be gained, and which are normally closed by detachable covers 21.

Keyed or otherwise secured to the hollow shaft 7 is a driven gear 22, and keyed or otherwise secured to the trunnion 15 is a driven gear 23. The driven gears 22 and 23 are designed to be independently but simultaneously driven by any suitable reduction gears so as to rotate either in the same or in opposite directions.

Disposed within the shaft 7 intermediate one end of the casing 14 and the filter disc adjacent thereto, is a partition 24 (see Figure 2), and formed in the shaft 7 to the right of the partition 24 as viewed in Figure 2, are a plurality of ports 25 for establishing communication between the right hand end of the hollow shaft 7 and the interior of the casing 14.

Secured to the right hand end of the shaft 7 by means of a stuffing box 26 is a feed intake fitting 27 by means of which pulp, slurry, or other material to be filtered may be delivered under pressure through the hollow shaft 7 and its ports 25 into the interior of the casing 14. The filtrate passing inwardly through the filter discs 8 into the hollow shaft 7 is discharged through a filtrate outlet 28 secured to the left hand end of the hollow shaft 7 through a stuffing box 29.

As above stated, the filter discs 8 are formed by any desired number of disc sectors 9. These sectors comprise a channel-shaped frame 31, to the inner end of which is welded or otherwise secured the nipple 11. As shown in Figure 3, the open ends of the nipples 11 are adapted to be inserted in and sealed in openings 33 formed in the shaft 7. Surrounding the frame 31 is an envelope 34 of any suitable filter medium, the lower end of which is secured to the nipple 11 by means of several turns of wire 35. Disposed within the frame 31 is a supporting and drainage screen or member 36 serving to keep the opposed sides of the envelope 34 of filter medium in spaced relation.

For the purpose of permitting the filter discs 8 to be mounted on the shaft 7 on closer centers than is normally possible, and still prevent twinning or bridging of the cakes formed on the filter discs when the cake is being formed or when it is being discharged by the application of a blow back, each of the filter sectors 9 is surrounded by a number of wire loops 37. These loops are held in spaced relation over the surface of the sectors by means of clips 38 struck out from a band 39 which partially surrounds the sector. As best shown in Figure 4, the bands 37 vary in length so as to conform to the width of the sector at the point at which it is desired to hold the filter medium in place.

It will be noted that the filter above described embodies the two main objects of my invention:

First, a pressure filter provided with a cylindrical shell which is arranged for rotation independently of the rotation of the filter discs, and which therefore results in an increased agitation of the slurry or pulp delivered thereto. If deemed desirable, the shell may be provided on its interior surface with narrow longitudinally extending bars or baffles for the purpose of lifting any solids which tend to settle to the lower portion of the shell. It should be noted that since the shell is cylindrical in form, it is able to withstand greater pressures than a shell which is provided on its surface with a trough for the accommodation of a scroll, as has been the practice in the past.

Second, the provision of means such as the loops 37 on the face of the filter discs for preventing the filter medium from bulging outwardly during the application of a blow back, which permits the discs to be placed on closer centers without causing the cakes formed thereon to twin, and therefore results in a filter of greater capacity.

I claim:

1. A filter comprising: a hollow rotatable shaft; a filter element mounted on and communicating with the interior of said shaft; a casing enclosing said filter element and journaled on said shaft for relative rotation therewith; means for delivering slurry to said casing; a filtrate outlet communicating with said shaft; means for rotating said shaft; and means for rotating said casing about said shaft.

2. A filter comprising: a hollow rotatable shaft; a filter element mounted on said shaft and communicating with the interior thereof; a casing enclosing said filter element and journaled on said shaft for independent rotation with respect thereto; means for delivering slurry to said casing through a portion of said shaft; a filtrate outlet communicating with another portion of said shaft; and means for independently rotating said shaft and said casing.

3. A filter comprising: a hollow rotatable shaft; a plurality of filter discs mounted on said shaft and communicating with the interior thereof; a casing enclosing said discs and journaled on said shaft; means for delivering slurry to said casing; a filtrate outlet communicating with said shaft; and means for independently and simultaneously rotating said shaft and said casing.

4. A filter comprising: a hollow rotatable shaft; a plurality of filter discs mounted on said shaft and communicating with the interior thereof; a casing enclosing said discs and journaled for rotation on said shaft; and means for independently but simultaneously rotating said shaft and said casing; said shaft being provided with a filtrate outlet communicating with one end thereof, with a partition intermediate one end of said casing and the filter disc adjacent said end, and with a port intermediate said partition and said end.

5. A filter comprising: a rotatable hollow shaft; means for rotating said shaft; a plurality of longitudinally spaced filter discs mounted along said shaft and communicating with the interior thereof, each of said discs being formed by a plurality of disc sectors and each of said sectors being covered with a filter medium; a casing enclosing said filter discs; means for delivering slurry to said casing; a filtrate outlet communicating with said shaft means disposed over the outer surfaces of said filter discs for retaining said filter medium in place and means for rotating said casing about said shaft.

6. A filter comprising: a rotatable shaft; means for rotating said shaft; a filter element mounted on said shaft; a casing enclosing said filter element and journaled on said shaft for rotation thereon; means for delivering slurry to said casing; means for withdrawing filtrate from said filter cell; and means for rotating said casing.

7. A filter element comprising: a sector-shaped frame provided with a filtrate connection; a filter medium covering the opposed faces of said frame and defining therewith a filtrate compartment; a band disposed over the perimeter of said frame and provided with spaced clips; and a plurality of spaced wire loops surrounding said frame and filter medium and secured thereto by said clips.

ORVILLE B. ACKERLY, Jr.